Figure 2A:
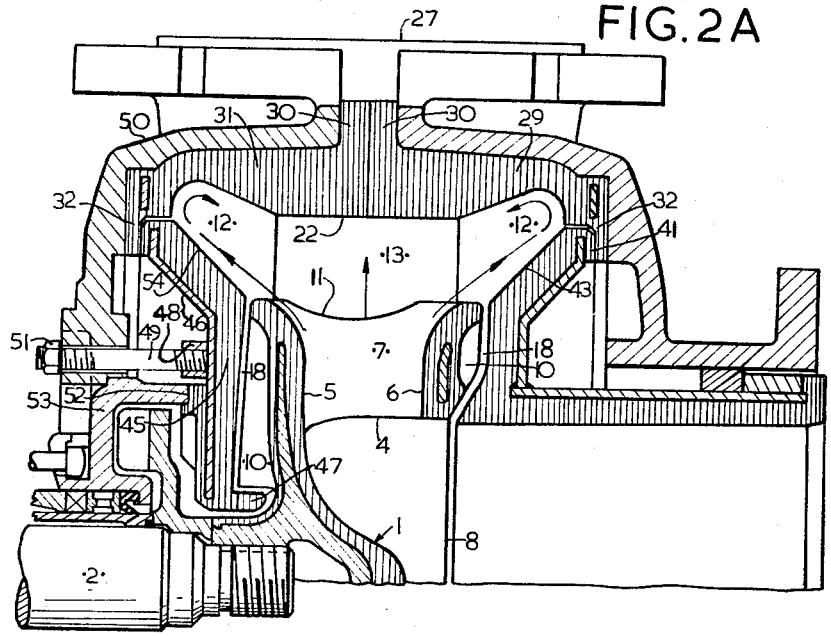

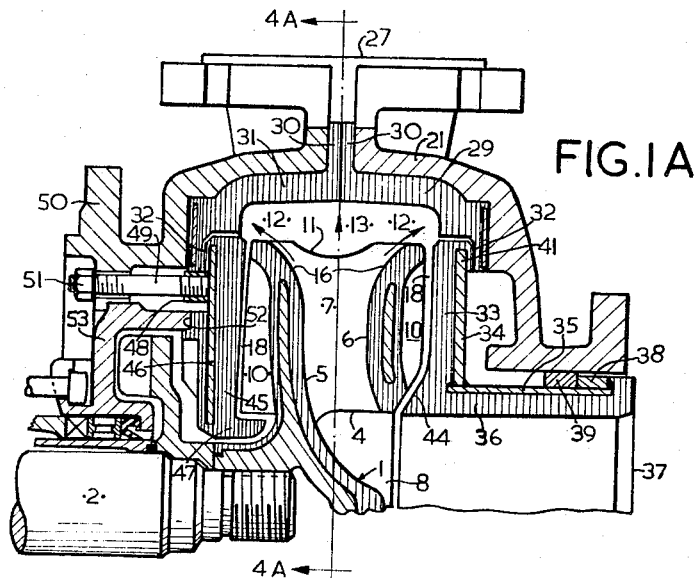

Aug. 9, 1966 C. H. WARMAN 3,265,002
CENTRIFUGAL PUMPS AND THE LIKE
Original Filed Jan. 13, 1961 5 Sheets-Sheet 2

Charles H. Warman,
Inventor

By Wenderoth, Lind and Ponack
Attorneys

United States Patent Office 3,265,002
Patented August 9, 1966

3,265,002
CENTRIFUGAL PUMPS AND THE LIKE
Charles H. Warman, Castlecrag, New South Wales, Australia, assignor to Research and Development Pty. Ltd., Perth, Western Australia, Australia, a corporation of Western Australia
Original application Jan. 13, 1961, Ser. No. 82,552, now Patent No. 3,146,722, dated Sept. 1, 1964. Divided and this application Aug. 3, 1964, Ser. No. 387,033
Claims priority, application Australia, Jan. 19, 1960, 56,621/60
6 Claims. (Cl. 103—103)

This application is a division of my prior application Serial No. 82,552, now Patent No. 3,146,722.

This invention relates to centrifugal pumps, blowers, fans, compressors and like centrifugal units which will hereinafter be referred to as centrifugal pumps for convenience.

One object of the invention is to provide more efficient pump components and constructions. Another object is to provide a pump casing which, when the pump is used for pumping abrasive material, is less liable to wear. Other objects are to provide improved components and constructions as hereinafter described.

In any centrifugal pump, whatever its type or construction, the fluid discharged from the impeller into the casing has a variable total energy—variable both as to time and point of discharge from the impeller. In the casing there are losses of fluid energy. These losses are not uniform throughout the fluid and tend further to distort the already uneven distribution of energy of the fluid leaving the impeller. Losses of fluid energy in the casing occur chiefly at the cutwater, adjacent the containing surfaces and in the discharge branch.

In conventional pumps the fluid or higher energy issues from the impeller within a disclike layer substantially normal to the axis of rotation and of less thickness than the axial width of the impeller passages. If the impeller has a single axial intake from one side the disc layer will be towards or against the opposite side wall of the impeller passages. If the impeller is symmetrical in axial section and has axial fluid entry from both sides and flowrates from each side are substantially equal the disc layer will emerge more or less centrally from the periphery of the impeller.

It is a fundamental physical requirement of fluid flow in a curved path that the fluid of higher total energy will move to and displace lower energy fluid from the outer portion of the path. The higher energy fluid within the disclike layer emerging from the impeller consequently moves to the outer portion of the casing where it circulates until either it passes into the discharge branch of the casing or, by shock and turbulence from the cutwater or friction against the casing surfaces, it loses energy sufficient to be displaced toward the axis of the pump by fluid of higher energy. The displaced fluid constitutes a return flow moving towards the impeller and, superimposed on the main flow, gives rise to spiral flows in the casing. If the disc layer of higher energy fluid emerges from the impeller symmetrically with respect to the casing the flow in the casing consists of right and left hand spiral flows of approximately equal strength moving outwards in the center of the casing and inwards adjacent each of the sidewalls towards the axis of the pump. The result of the fluid movements described is that fluid of lower energy is displaced to positions adjacent the peripheries of the running clearances between the impeller and the sidewalls of the casing and portion of it passes into the clearances from where it either returns to the casing by being re-energised by the side disc friction of the rotating impeller or joins the fluid entering the intake opening of the impeller. If the disc layer of higher energy fluid emerges from the impeller asymmetrically with respect to the casing then the spiral flows will correspondingly differ in size and strength and more or less lower energy fluid will be displaced to each side of the impeller. When the fluid contains solids in suspension the solids, particularly if large and of high density relative to the fluid in which they are transported, lose even more energy than does the fluid by shock and turbulence from the cutwater and friction against the casing surfaces and tend to become concentrated in the lower energy fluid and to pass with it into the running clearances between the impeller and the casing and there cause rapid wear of the parts and consequent reduced performance of the pump. Certain features of this invention provide zones of higher energy fluid adjacent the peripheries of the running clearances between the impeller and the sidewalls of the casing which act as barriers to isolate these clearances from the lower energy fluid in the casing.

In conventional pumps the discharge branch forms on the one side a continuation of the casing, at its maximum radius and hence it preferentially discharges the higher energy fluid which occupies the outer portion of the casing. The other or cutwater side of the discharge branch is adjacent the periphery of the impeller and extends for the full width of the casing at this point. Consequently the higher energy fluid issuing from the impeller impinges directly on the cutwater and, even under the most favourable conditions at best efficiency point, considerable shock and turbulence take place with corresponding loss in efficiency. When the fluid contains solids in suspension, as with slurry or dredge pumps, the shock and turbulence from impingement on the cutwater and resultant production of lower energy fluid with a higher than average concentration of solids is the most potent cause of wear of the pump components. This invention provides a construction in which the cutwater can be of substantially less width than the casing. It also provides that the cutwater may be so positioned that it cuts only fluid of lower energy. In these ways efficiency can be improved and wear reduced.

In conventional pumps a portion of the disc layer of higher energy fluid issuing from the impeller enters the discharge branch directly without impinging on any surface and, having moved the least distance of any fluid in the casing, has the highest energy of all fluid entering the discharge branch. It is flanked on either side in an axial direction by fluid of lower energy entering the discharge branch and this lower energy fluid is held towards the cutwater side by higher energy fluid occupying the outer portion of the discharge branch. Conventionally the discharge branch comprises a diverging nozzle with a substantially straight axis and its object is to convert fluid kinetic energy into pressure at the discharge flange. As the axis is straight the pressure over any cross section of the discharge branch is substantially uniform so that variation in energy level of the fluid entering the branch from the casing appears as variation in kinetic energy and hence as variation in velocity over the cross section, areas of higher velocity corresponding with the areas occupied by fluid of higher energy. It is well known that it is not possible efficiently to convert fluid kinetic energy to pressure in a diverging nozzle when the velocity distribution is sensibly non-uniform and as the conversion corresponds to that to be expected from the lower velocity fluid, substantial loss of energy is sustained by the fluid of higher velocity. Features of this invention enable the fluid to enter the discharge branch with substantially uniform energy and velocity and thereby allow a higher efficiency of conversion of kinetic energy to pressure to be attained than is possible in a conventional pump.

Generally in a pump or blower according to the invention, means are provided for segregating and directing or for producing, segregating and directing fluid of differing energy levels in such a way that in the casing fluid of higher energy level forms an envelope about the fluid of lower energy level.

As a means of preserving the envelope of higher energy fluid and also of ensuring the greatest uniformity in the level of the energy of the fluid leaving the casing, the entry to the discharge branch from the casing is so located and shaped as to receive preferentially fluid of lower energy level and to exclude fluid of high energy level. As a result fluid energy losses resulting from casing wall contact are borne substantially by the higher energy fluid.

In one specific form the invention comprises an impeller so shaped that its discharge consists of two peripheral side zones of higher energy fluid separated by a zone of lower energy fluid, the zones of higher energy being directed towards the casing sidewalls adjacent the periphery of the impeller.

One function of the shape of an impeller according to the invention is so to control the difference in energy levels of the fluid discharged by the impeller that the energy level of the higher energy fluid is reduced in the casing to substantially that of the lower energy fluid at entry to the discharge branch of the casing.

Figure 2B:
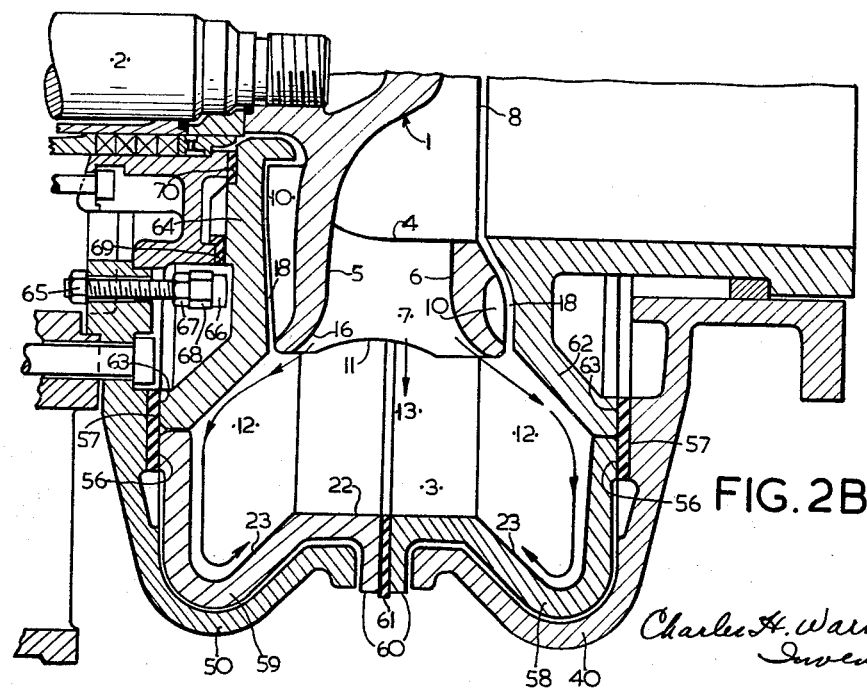
Figure 3:
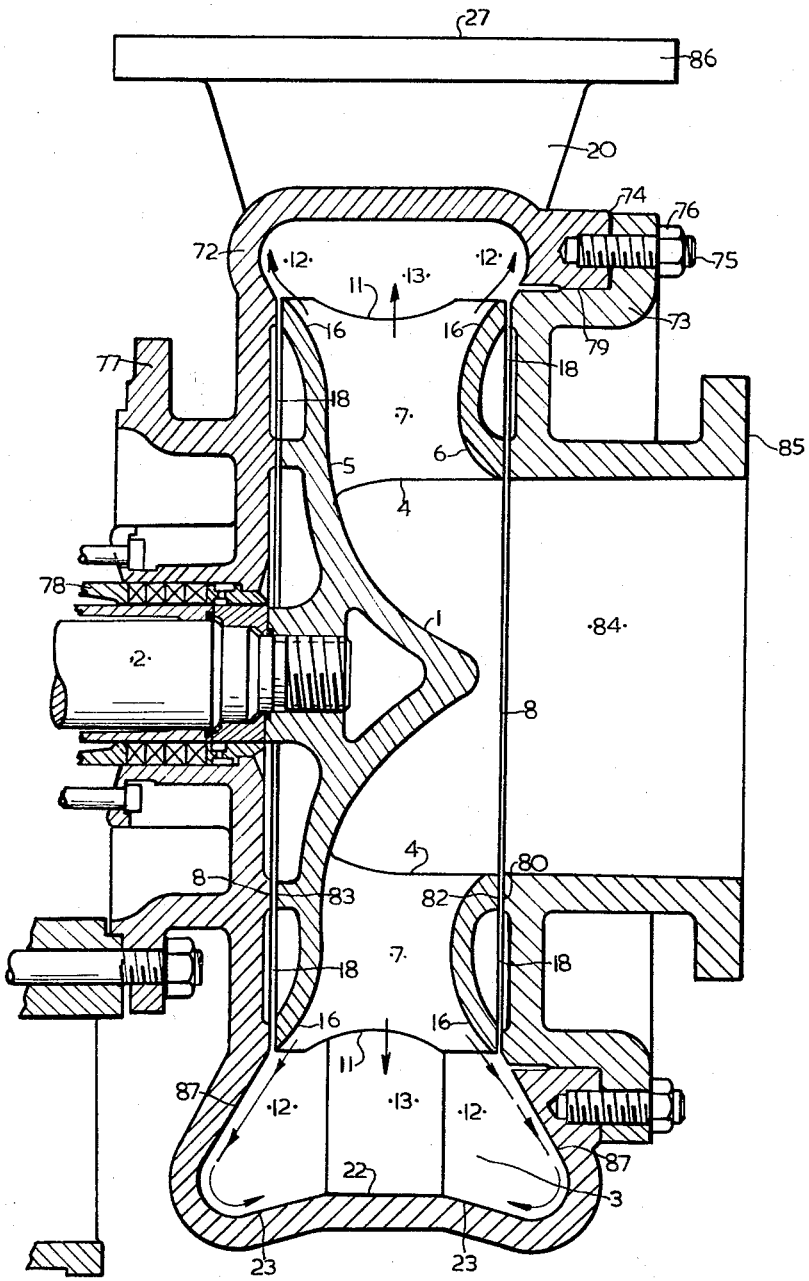
Figure 4A:
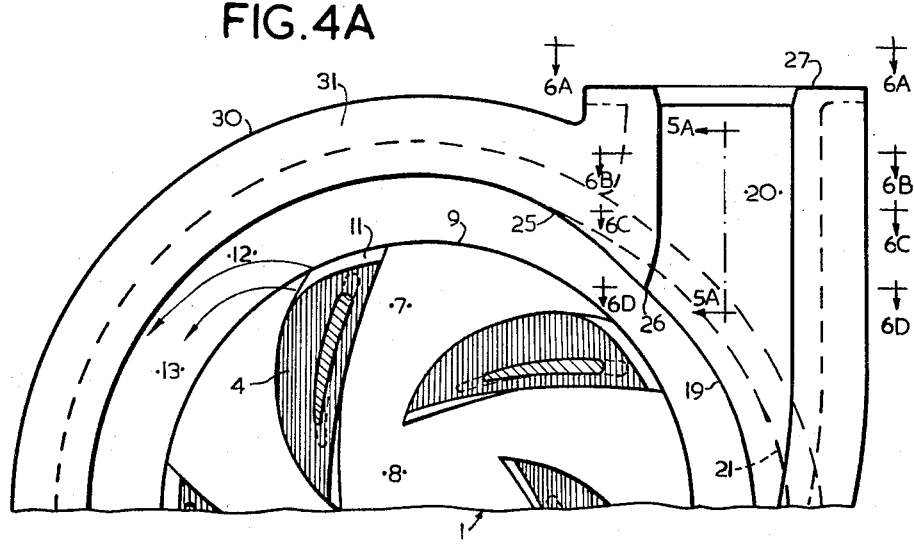
Figure 4B:
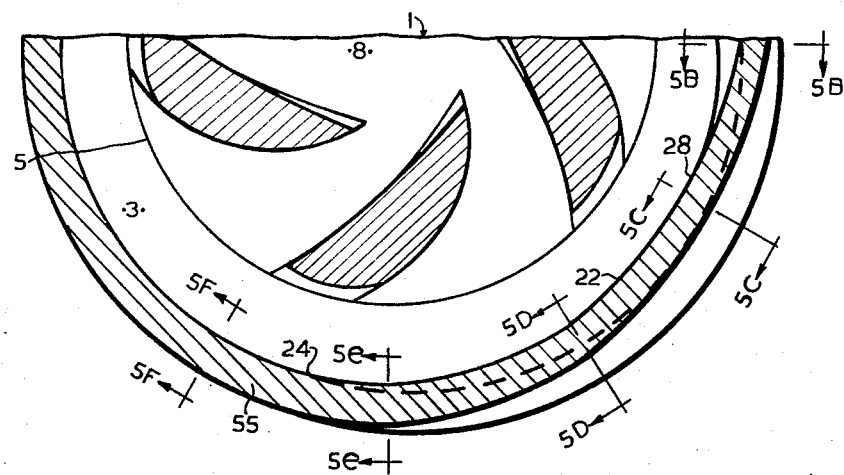
Figure 6A:
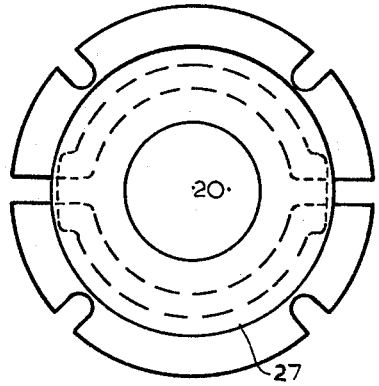
Figure 5A:
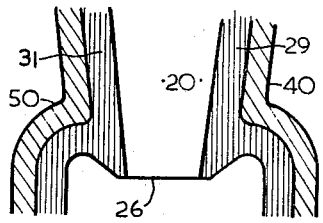
Figure 5B:
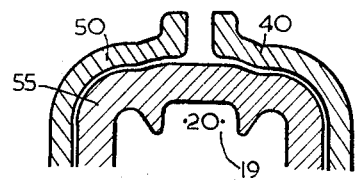
Figure 6B:
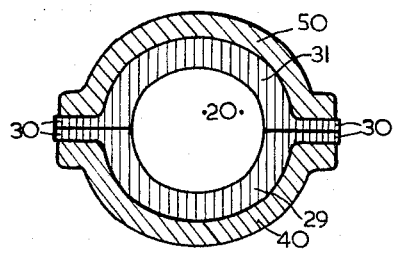
Figure 5C:
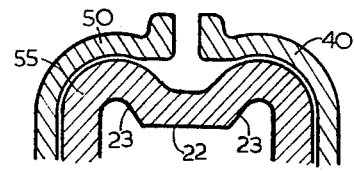
Figure 6C:
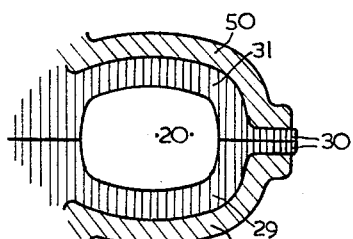
Figure 5D:
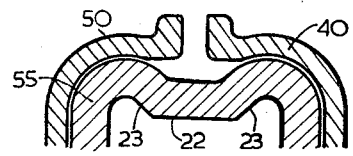
Figure 5E:
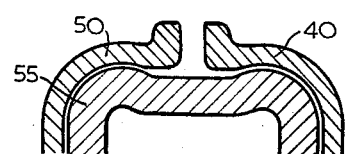
Figure 5F:
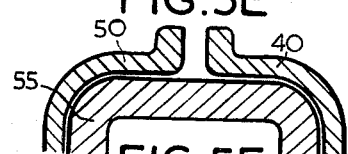
Figure 6D:
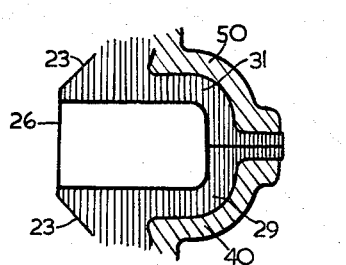

Some specific forms of the invention are illustrated in the accompanying drawings, wherein:

FIGS. 1A, 1B, 2A, 2B and 3 are axial sections and half sections showing different forms of impeller and casing, FIGS. 4A and 4B are half sections on lines 4a—4a and 4b—4b of FIGS. 1A and 1B respectively with supporting shell members removed, FIG. 5A is a fragmentary section of the casing on line 5a—5a of FIG. 4A, FIG. 5B is a fragmentary section of the casing on line 5b—5b of FIG. 4B, FIG. 5C is a fragmentary section of the casing on line 5c—5c of FIG. 4B, FIG. 5D is a fragmentary section of the casing on line 5d—5d of FIG. 4B, FIG. 5E is a fragmentary section of the casing on line 5e—5e of FIG. 4B, FIG. 5F is a fragmentary section of the casing on line 5f—5f of FIG. 4B, FIG. 6A is a fragmentary section of the casing on line 6a—6a of FIG. 4A, FIG. 6B is a fragmentary section of the casing on line 6b—6b of FIG. 4A, FIG. 6C is a fragmentary section of the casing on line 6c—6c of FIG. 4A, FIG. 6D is a fragmentary section of the casing on line 6d—6d of FIG. 4A.

Like parts are illustrated by like characters throughout the specification and drawings.

As shown in the drawings, and especially with reference to FIGS. 1A and 4A, the pump comprises a casing C which has axially spaced opposed walls 34 and 46, which in the embodiment of FIG. 1A are lined with a soft wear resistant material at 33 and 45. The casing C has a peripheral wall 21 made up of the peripheral portions of the casing halves and lined with wear resistant linings 29 and 31. The axially spaced walls and peripheral wall define a pumping chamber 3, and projecting into the pumping chamber toward the axis of the casing is a ridge 22 (FIG. 1B) which extends around a substantial portion of the periphery of the circumferential wall of the casing. The opposite peripheral ends 24 and 25 (FIGS. 4A and 4B) of said ridge taper gradually outwardly toward the circumferential wall of the casing in the circumferential direction of said ridge. The ridge 22 has a top surface 22a which has an axial width substantially less than the axial spacing of the side walls. The ridge 22 and the side walls define between them circumferentially extending concave grooves 23 which are coextensive with said ridge.

An impeller 1 is mounted on a shaft 2 for rotation in the counterclockwise direction (as viewed in FIGS. 4A and 4B) within the pumping chamber 3 of the casing. The impeller of FIG. 1A has opposed axially spaced walls 5 and 6 with the peripheral portions of the inwardly opposed surfaces of the walls 5 and 6 flared smoothly outwardly at 16 toward the respective adjacent opposed walls of the casing. The impeller 1 further has blades or vanes 4 between the walls 5 and 6 which define between them passages 7 leading from an axial inlet 8 to impeller outlets 9. The outside surfaces of the impeller walls 5 and 6 can have auxiliary side vanes 10 mounted thereon. In the open impeller form of FIG. 1B, the front plate or wall 6 with its auxiliary vanes 10 is omitted and the main vanes 4 extend axially to conform with suitable side running clearance to the surface of the adjacent casing side member.

The radially outer trailing ends of the vanes 4 have a smooth concave recess 11 in the central portion thereof, the effect of which is to reduce the energy imparted to the fluid in the region of the groove by the impeller. As illustrated, the center line of the groove 11 is offset in the axial direction from the centerline of the impeller in the direction of the impeller wall 5 which is remote from the intake, in order to counteract the effect of the single axial intake, which would otherwise cause the fluid to issue from the impeller with energy and volume which is greater adjacent the plate 5 than adjacent the plate 6. The extent, shape and position of the grooves 11 and the ends of the vanes 4 depends on the relative energy levels, volumes, positions and flow directions of the fluid energy zones required by a particular pump construction and the point of operation on the pump characteristic performance curve.

The casing has a discharge branch 20 thereon which opens into the pumping chamber 3 of the casing only through the top surface 22a of the ridge 22 at 19 along a portion of the length of the ridge 22, said portion of the length of the ridge being at radial distances from the center of the casing which are less than the radial distances of the remainder of the top surface 22a from the center of the casing.

It will thus be seen that the impeller walls 5 and 6, with the outwardly flared portions 16 thereof, the opposed casing wall portions, the concave grooves 23, and the ridge 22 coact to produce a pair of fluid flows represented by the arrows 12, which flows are outwardly diverging from the periphery of the impeller 1, and then inwardly converging at the sides of the ridge 22. The flows 12 define a low energy central zone 13 into which fluid discharged from the grooved portion of the ends of the impeller vanes is discharged. In this manner the higher energy fluid flows form an envelope about the lower energy fluid, sustaining the losses from friction with the walls and isolating the low energy fluid from the impeller clearance spaces 18 between the impeller and the side walls.

By locating the opening 19 into the discharge branch 20 in the top of the ridge 22 at a smaller radius from the casing axis than the radius of the outer wall 21 of the casing, the higher energy fluid is excluded from the discharge. The ridge 22 and the grooves 23 are shaped so as to minimize the disturbance to the fluid flow in the casing, and the grooves are made of sufficient size to allow the higher energy fluid to bypass the entry 19 to the discharge branch. The ridge 22 is in general symmetrically positioned with respect to the casing as viewed in axial section, but it may be offset to suit some types of pump construction.

In the open form of impeller shown in FIG. 1B, the peripheral diameter of the vanes 4 is largest at 17 adjacent the side wall of the casing and has the effect not only of imparting more energy to the fluid leaving the impeller in this region but also of bestowing on the fluid flow an axial component towards the adjacent side wall of the casing. The construction of FIG. 1B produces an inner layer of lower energy level fluid surrounded by an envelope of higher energy level fluid, as does that of FIG. 1A.

By locating the entry 19 (see FIG. 4A) to the discharge branch 20 from the casing at a shorter distance from the pump axis than the outer wall 21 of the casing nearby, the higher energy fluid is excluded from the discharge. Typically the entry to the discharge branch is located in a raised portion of the casing projecting inwardly towards the axis of the pump. The raised portion takes the form of an elongated circumferential ridge 22 (see FIG. 5C) with sloping sides 23, the ends fading gradually into the casing wall as at 24 and 25 (see FIGS. 4A and 4B) and being shaped so as to minimize disturbance to the fluid flow in the casing. Sufficient area alongside the ridge 22 is provided to allow the higher energy fluid to bypass the entry to the discharge branch. The ridge 22 is in general symmetrically positioned with respect to the casing as viewed in axial section but may be offset to suit some types of pump construction.

The entry 19 to the discharge branch, is in the form of an elongated circumferential slot occupying substantially the whole of the width of the top of the ridge 22 which is substantially less than the width of the casing. One end of the slot forms the cutwater 26 the width of which is consequently also substantially less than the width of the casing. In effect the ridge 22 penetrates the envelope of higher energy fluid 12 and places the entry to the discharge branch in a position to receive preferentially the lower energy fluid 13. The loss of energy at the cutwater 26 is a minimum because the cutwater has the least possible width and cuts only the fluid of lower energy.

To ensure minimum loss of energy the area and attitude of the entry to the discharge branch are so arranged as to allow the fluid to pass from the casing into the discharge branch with velocity substantially unchanged in both direction and magnitude. The area of cross section of the discharge branch 20 provided at the cutwater section 6d—6d (FIG. 6D) is such that the velocity of the fluid passing this cross section is substantially the same as at the entry 19 to the discharge branch. The portion of the discharge branch from the cutwater cross section 6d—6d to the discharge flange 27 is of increasing cross sectional area and so shaped that the centers of area of cross sections (FIGS. 6A to 6D inclusive), lie on a straight line substantially normal to the discharge flange, the rate of increase of cross sectional area being low enough throughout to ensure that high efficiency of conversion of the fluid kinetic energy to pressure at the discharge flange 27 is achieved. The shape of the discharge branch 20 is such that the walls are regular in the direction of fluid flow and transition in change of direction and the shape and area of cross section is gradual, as shown in FIGS. 4A and 5A and FIGS. 6A to 6D inclusive.

Within the casing the cross sectional area increases uniformly from the cutwater 26 to the commencement of the discharge branch at 28, in the direction of rotation, to accommodate fluid discharged by the impeller 1. From the commencement of the discharge branch at 28 (FIG. 4B) to the cutwater 26 in the direction of rotation the cross sectional area of the casing decreases so as to maintain a constant average fluid velocity in this portion of the casing as fluid enters the discharge branch 20.

The casing comprises separately renewable sections shaped according to the invention with suitable joints between. For abrasive duty the casing sections are constructed of wear resistant materials and are supported and located by separate shell members. Such constructions are illustrated in FIGS. 1A and 1B for a low specific speed type pump and in FIGS. 2A and 2B for a pump of higher specific speed. For non-abrasive or very slightly abrasive duty the casing sections are self-supporting and self-locating. Such a construction is illustrated in FIG. 3. FIGS. 1A and 2A illustrate abrasion resisting construction in resilient material such as natural or synthetic rubber reinforced where necessary with metal. FIGS. 1B and 2B illustrate abrasion resisting constructions in hard metal.

A half outer casing section is shown in resilient material construction as 29 in FIGS. 1A and 2A. It carries half of the ridge 22 and half of the discharge branch 20 and has a flange 30 adapted to be joined on the plane of symmetry of the casing to a half outer casing section of opposite hand. The outer half casing sections each have a side flange 32 adapted to make a joint in the manner shown with the casing side section.

The intake side casing section is a disc-like member formed of wear resistant material such as the resilient natural or synthetic rubber 33 bonded to the metal reinforcing plate or wall 34 which carries a hollow cylindrical metal portion 35 to which is bonded the rubber lining 36 to form the intake 8. The cylindrical metal reinforcement 35 is provided with an annular shoulder 38 against which bear tapered cotters 39 driven through slots in the supporting intake side shell member 40. Driving of the cotters 39 draws the intake side casing section liner 33 tightly against the resilient flange 32 of the outer casing section 29 which is supported by the shell member 40 and a fluid-tight joint is thus made with the resilient facing 41 of the side casing section liner. The rubber-lined intake branch 8 of the side casing section liner 33 projects slightly beyond the face of the flange 42 of the shell member 40 and is adapted to make a fluid-tight joint with an intake pipe bolted to the flange. The intake side casing section liner 33 may be bevelled as at 43 in FIG. 2A to conform with the direction and facilitate the movement of the higher energy fluid flow from the impeller. A conical projection 44 to which the impeller conforms, is provided about the intake branch 8 to facilitate the entry of abrasive slurry into the impeller and direct abrasive particles away from the side clearance space 18 between the impeller and the casing side section.

The shaft side casing section liner 45 is a disc-like member formed of resilient material such as natural or synthetic rubber bonded to the metal reinforcing plate or wall 46. It has an annular projection 47 to the outer surface of which the auxiliary vanes 10 on the impeller conform with suitable running clearance, the purpose of the projection being to return to the vanes fluid leakage from the running clearance between the impeller and the casing side section. The reinforcing plate or wall 46 is provided with threaded bosses 48 into which studs 49 are screwed. The studs pass through holes in the shell member 50 and are provided with nuts 51 which may be tightened to draw the casing section liner 45 against the flange 32 of the outer casing section liner 31 and against the face 52 of the seal member 53, where fluid-tight joints are thus made. The shaft side casing section 45 may be bevelled as at 54 in FIG. 2A to conform with the direction and facilitate the movement of the higher energy fluid flow from the impeller.

The shell members 40 and 50 which locate and support the casing sections are drawn together by suitable bolts not shown in the figures and press together the resilient flanges 30 of the outer casing sections to make a fluid-tight joint. The shell member 50 is adapted to locate and support interchangeably various forms of impeller shaft sealing means and to attach to a frame not shown in the figures for supporting the shaft bearings and maintaining alignment of the various parts.

An outer casing section is shown in one piece hard metal construction at 55 in FIG. 1B. It has raised annular faces 56 which may be rough ground and are adapted to make fluid-tight joints with annular rings 57 of resilient material supported by the shell members 40 and 50 respectively. In FIG. 2B is shown a two piece hard metal construction of the outer casing section, the half sections 58 and 59 being of opposite hand and having flanges 60 between which a fluid-tight joint is made by means of a gasket 61 of resilient material. The half outer casing sections are each provided with raised annular faces 56 which may be rough ground and are adapted to make fluid-tight joints with the annular resilient rings 57. The hard metal outer casing sections are shaped and sized externally so as to be everywhere clear of the shell members 40 and 50 from which they are supported, and have joint sealing pressure applied, through the joint rings 57.

The hard metal intake side casing sections 62 shown in FIGS. 1B and 2B are similar in shape and size to the corresponding sections in rubber covered construction illustrated in FIGS. 1A and 2A. The raised annular face 63, which may be rough ground, is pressed against the resilient ring 57 to make a fluid-tight joint by driving the tapered cotters 39 which pass through slots in the shell member 40 and bear on the annular shoulder 38.

The hard metal shaft side casing sections 64 are similar in most respects to the corresponding sections in the rubber covered construction. The raised annular face 63, which may be rough ground, is pressed against the resilient ring 57 by tightening the nuts of bolts 65 which pass through the shell member 50 in the manner of the studs 49 and which engage by means of square heads 66 and locknuts 67 suitable lugs 68 cast integrally with the side casing section 64. Resilient gaskets 69 and 70 serve to make fluid-tight joints between the casing side section 64 and adjacent seal member 71.

The self supporting casing construction illustrated in FIG. 3 comprises two casing sections 72 and 73 face-jointed with a gasket at 74 and held together by studs 75 and nuts 76. Casing section 72 is flanged as at 77 for attaching to any suitable supporting frame and is provided with sealing means 78 where the shaft 2 supporting the impeller 1 passes through the casing. Casing section 72 has a cylindrical opening 79 co-axial with the impeller and of diameter sufficiently large to permit easy removal of the impeller when the casing section 73, which closely fits the opening, is removed. The axial dimensions of the casing sections are such that when assembled the faced annular projections 80 and 81 on the respective sections are a close running fit with corresponding faced annular projections 82 and 83 on the sides of the impeller. The casing section 73 is provided with the intake branch 84 which may be flanged as at 85 or otherwise adapted for connection to an intake pipe. Casing section 72 is provided with integral discharge flange 86 or other suitable means for connection to a discharge pipe.

As depicted in FIG. 3 the impeller and casing are for a pump of medium specific speed. Beyond the diameter of the impeller the walls of the casing diverge as at 87 and the outward flare of the impeller side plates and the dimensions and location of the groove 11 in the periphery of the impeller vanes are such as to project the streams 12 of higher energy fluid leaving the impeller adjacent and parallel to the diverging walls of the casing. The outer portion and discharge branch of the casing section 72 is shaped on its internal surface substantially as previously described with reference to FIGS. 4, 5 and 6.

The claims defining the invention are as follows:
1. A centrifugal pump, comprising a casing having axially spaced opposed walls and a peripheral wall defining a pumping chamber, said peripheral wall having a circumferentially extending ridge extending around a substantial portion of the periphery of said circumferential wall and projecting inwardly toward the axis of the casing, the opposite peripheral ends of said ridge tapering gradually outwardly toward said circumferential wall in the circumferential direction of said ridge, said ridge having a top surface having an axial width substantially less than the axial spacing of said side walls, said ridge and spaced side walls defining between them circumferentially extending concave grooves coextensive with said ridge, an impeller in the pumping chamber of said casing rotatable about the axis of said casing, said impeller having at least one approximately radial wall with the peripheral portions of the inward surface of each wall flared smoothly outwardly toward the adjacent wall of said casing, said impeller further having circumferentially spaced vanes secured to the inner face of at least one of said walls, the radially outer trailing end of each said vane having a smooth concave recess in the central portion thereof said opposed walls of said casing curving smoothly from adjacent the periphery of said impeller into said grooves, and a discharge branch on said casing and opening into said pumping chamber of said casing only through the top surface of said ridge along a portion of the length of said ridge, said portion of the length of the ridge being at radial distances from the center of the casing which are less than the radial distances of the remainder of the top surface from the center of the casing, whereby each said impeller wall, its vanes, said opposed casing walls, the concave grooves in said peripheral wall and said ridge coact to produce a pair of fluid flows which are outwardly diverging from the periphery of said impeller and then inwardly converging at the sides of said ridge, and said flows defining a low energy central zone at said discharge opening in said top surface of said ridge.

2. A pump as in claim 1 wherein the impeller has only one wall.

3. A centrifugal pump as claimed in claim 1 in which the said ridge is symmetrically positioned on the peripheral wall of said casing.

4. A centrifugal pump as claimed in claim 2 in which the said ridge is symmetrically positioned on the peripheral wall of said casing.

5. A centrifugal pump as claimed in claim 1 in which said opposed walls of said casing are inclined outwardly at an angle to the casing axis adjacent the periphery of said impeller.

6. A centrifugal pump as claimed in claim 2 in which said opposed walls of said casing are inclined outwardly at an angle to the casing axis adjacent the periphery of said impeller.

References Cited by the Examiner

UNITED STATES PATENTS

| | | | |
|---|---|---|---|
| 873,923 | 12/1907 | Cousans | 230—128 |
| 1,166,257 | 12/1915 | Rees | 103—115 |
| 1,967,182 | 7/1934 | Allen | 103—14 |
| 2,465,625 | 3/1949 | Aue | 230—128 |
| 2,992,617 | 7/1961 | Kroeger | 103—115 |

FOREIGN PATENTS

| | | |
|---|---|---|
| 28,997 | 9/1957 | Finland. |
| 529,613 | 9/1921 | France. |
| 698,340 | 11/1930 | France. |
| 752,623 | 7/1933 | France. |
| 62,505 | 6/1842 | Germany. |
| 1,059,289 | 1/1959 | Germany. |
| 323 | 1868 | Great Britain. |
| 251,696 | 5/1926 | Great Britain. |
| 68,264 | 6/1951 | Netherlands. |

SAMUEL LEVINE, *Primary Examiner.*

H. F. RADUAZO, *Assistant Examiner.*